United States Patent
Dinan et al.

(12) 
(10) Patent No.: US 6,507,456 B1
(45) Date of Patent: Jan. 14, 2003

(54) DUAL COIL AND LEAD CONNECTIONS FABRICATED BY IMAGE TRANSFER AND SELECTIVE ETCH

(75) Inventors: Thomas Edward Dinan, San Jose, CA (US); Richard Hsiao, San Jose, CA (US); Eric James Lee, San Jose, CA (US); Scott A. MacDonald, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 09/651,149

(22) Filed: Aug. 30, 2000

(51) Int. Cl.[7] ................................................. G11B 5/17
(52) U.S. Cl. ..................................................... 360/123
(58) Field of Search ................................. 360/123, 126, 360/317, 318; 29/603.13

(56) References Cited

U.S. PATENT DOCUMENTS

| | | | |
|---|---|---|---|
| 4,743,988 A | 5/1988 | Sato et al. | 360/126 |
| 5,124,870 A | 6/1992 | Toyoda | 360/126 |
| 5,170,302 A | 12/1992 | Matsumoto | 360/123 |
| 5,734,534 A | 3/1998 | Yamamoto et al. | 360/123 |
| 5,793,272 A | 8/1998 | Burghartz et al. | 336/200 |
| 5,884,990 A | 3/1999 | Burghartz et al. | 336/200 |
| 6,178,070 B1 * | 1/2001 | Hong et al. | 360/119 |
| 6,195,872 B1 * | 3/2001 | Sasaki | 216/22 |

FOREIGN PATENT DOCUMENTS

| | | |
|---|---|---|
| JP | 59-075420 | 4/1984 |
| JP | 3034110 A | 6/1989 |
| JP | 03-241768 | 10/1991 |
| JP | 08279108 | 10/1996 |

* cited by examiner

Primary Examiner—Robert S. Tupper
(74) Attorney, Agent, or Firm—Robert O. Guillot; Intellectual Property Law Offices

(57) ABSTRACT

A magnetic head including a dual layer induction coil fabricated by reactive ion etching (RIE) techniques. An etch stop layer and an etchable insulation material layer and an induction coil etching mask are fabricated on a first magnetic pole. Induction coil trenches are thereafter RIE etched into the insulation material to the etch stop layer, and the first induction coil is fabricated into the induction coil trenches. Following a chemical mechanical polishing (CMP) step, a second etch stop layer, a second layer of etchable insulation material and a second induction coil etching mask are fabricated. Second induction coil trenches are RIE etched into the second insulation material layer to the second etch stop layer, and a second induction coil is fabricated into the second induction coil trenches. A second CMP step is followed by an insulation layer and the fabrication of a second magnetic pole (P2) upon the insulation layer.

15 Claims, 5 Drawing Sheets

DUAL COIL AND LEAD CONNECTIONS FABRICATED BY IMAGE TRANSFER AND SELECTIVE ETCH

BACKGROUND OF THE INVENTION

1. Field of the Invention

The present invention relates generally to magnetic heads for hard disk drives, and more particularly to magnetic heads having multiple layer write head induction coils, and methods for the fabrication thereof.

2. Description of the Prior Art

Magnetic heads commonly include write heads having two magnetic pole members and a flat, spiral induction coil disposed therebetween. Write head electrical current that passes through the induction coil creates a magnetic flux in the two magnetic pole members, and the magnetic flux passes through a write head pole tip, to write magnetic data bits onto the media, such as a hard disk, that is disposed proximate the pole tip. To improve the performance characteristics of write heads, efforts have been directed to increasing the magnetic flux that is generated by the induction coil in order to increase the magnetic field at the pole tip, such that data bits can more easily and reliably be written onto the magnetic media.

One prior art method for increasing the write head magnetic flux is to increase the number of induction coil turns that are fabricated between the two magnetic pole pieces. These efforts have lead to redevelopment of multiple layered induction coils. However, such multiple layer induction coils, as are known in the prior art, are generally difficult to reliably fabricate. Specifically, the prior art dual coil fabrication methods have generally employed well known photolithographic techniques which have resulted in problems related to the difficulty of removing the plating seed layer between coil turns, as well as a difficulty in filling the space between coil turns with alumina, or a similarly acceptable material, following the plating of the coil turns. The present invention utilizes a selective plasma etching fabrication technique which avoids the prior art problems.

SUMMARY OF THE INVENTION

The magnetic head of the present invention includes a dual layer induction coil having coil turns that are more accurately and reliably spaced due to the use of reactive ion etching fabrication techniques. Following the fabrication of the first magnetic pole (P1) an etch stop layer is deposited. Thereafter, a layer of an etchable insulation material is deposited, followed by the fabrication of an induction coil etching mask thereon. Utilizing a reactive ion etch process, induction coil trenches are thereafter etched into the etchable insulation material down to the etch stop layer. The first induction coil is then fabricated into the induction coil trenches, preferably utilizing standard electrodeposition techniques. Following a chemical mechanical polishing (CMP) step to remove excess induction coil material and the first induction coil etching mask, a second etch stop layer is deposited upon the first induction coil. Thereafter, a second layer of etchable insulation material is deposited followed by the fabrication of a second induction coil etching mask. A second reactive ion etch process is then conducted to etch the second induction coil trenches into the second etchable insulation material layer down to the second etch stop layer. The second induction coil is next fabricated into the second induction coil trenches, preferably utilizing electrodeposition techniques. Thereafter, excess induction coil material and the second induction coil etching mask are removed in a second CMP step. Thereafter, an insulation layer is deposited upon the second induction coil, followed by the fabrication of a second magnetic pole (P2) upon the insulation layer. In the preferred embodiments, the first and second etchable insulation material layers are composed of the same material and the first and second etch stop layers are also composed of the same material. Where the etchable insulation material is composed of an organic polymer, the first and second etch stop layers may be composed of $SiO_2$ or $Al_2O_3$. Where the first and second etchable insulation material layers are composed of $SiO_2$, the first and second etch stop layers are composed of $Al_2O_3$.

It is an advantage of the magnetic head of the present invention that it includes multiple layered induction coils that are more reliably fabricated.

It is another advantage of the magnetic head of the present invention that it includes multiple layered induction coils having reduced spacing between coil traces due to the use of reactive ion etching techniques.

It is a further advantage of the magnetic head of the present invention that insulation between induction coil traces of multiple layered induction coils is more reliably fabricated.

It is an advantage of the disk drive of the present invention that it includes a magnetic head having multiple layered induction coils that are more reliably fabricated.

It is another advantage of the disk drive of the present invention that it includes a magnetic head that includes multiple layered induction coils having reduced spacing between coil traces due to the use of reactive ion etching techniques.

It is a further advantage of the disk drive of the present invention that it includes a magnetic head having insulation between induction coil traces of multiple layered induction coils that is more reliably fabricated.

It is an advantage of the method for fabricating a magnetic head of the present invention that a multiple layer induction coil is more reliably produced.

It is another advantage of the method for fabricating a magnetic head of the present invention that the spacing between induction coil traces can be reduced by using reactive ion etching techniques.

The foregoing and other objects, features, and advantages of the present invention will be apparent from the following detailed description of the preferred embodiment which makes reference to the several figures of the drawing.

IN THE DRAWINGS

DETAILED DESCRIPTION OF THE PREFERRED EMBODIMENTS

Figure 1:
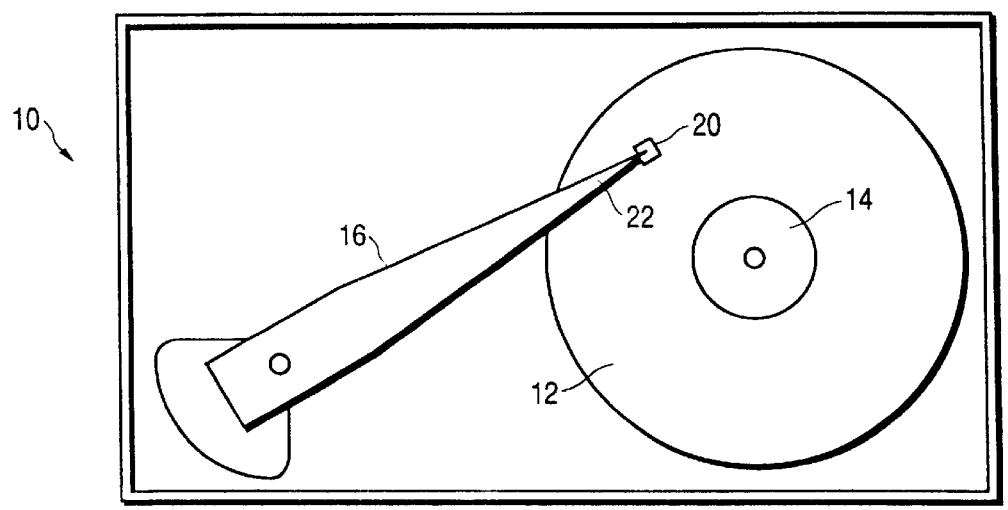
FIG. 1 is a simplified depiction of a hard disk drive of the present invention.

FIG. 1 is a top plan view that depicts significant components of a hard disk drive which includes the magnetic head of the present invention. The hard disk drive 10 includes a magnetic media hard disk 12 that is rotatably mounted upon a motorized spindle 14. An actuator arm 16 is pivotally mounted within the hard disk drive 10 with a magnetic head 20 of the present invention disposed upon a distal end 22 of the actuator arm 16. A typical hard disk drive 10 may include a plurality of disks 12 that are rotatably mounted upon the spindle 14 and a plurality of actuator arms 16 having a magnetic head 20 mounted upon the distal end 22 of the actuator arms. As is well known to those skilled in the art, when the hard disk drive 10 is operated, the hard disk 12 rotates upon the spindle 14 and the magnetic head 20 is formed as an air bearing slider that is adapted for flying above the surface of the rotating disk. The slider includes a substrate base upon which the various layers and structures that form the magnetic head are fabricated. Such heads are fabricated in large quantities upon a wafer substrate and subsequently sliced into discrete magnetic heads 20.

Figure 2:
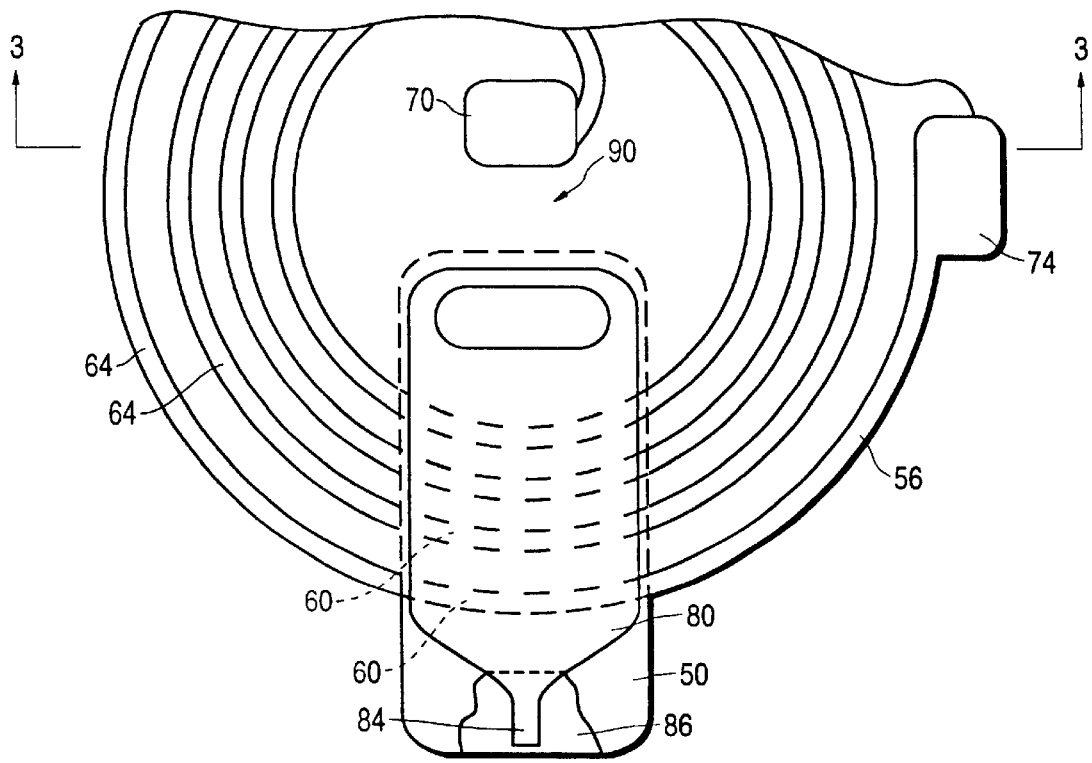
FIG. 2 is a top plan view depicting a typical prior art magnetic head and providing a view orientation that is utilized in the following figures and in describing the present invention.

FIG. 2 is a top plan view of a typical prior art magnetic head, wherein view lines 3—3 provide the orientation for the subsequent figures that depict various fabrication steps of the present invention. As depicted in FIG. 2, the typical prior art magnetic head includes a first magnetic pole (P1) 50 that has been fabricated upon an insulative magnetic shield layer of the magnetic head as is well known to those skilled in the art. Thereafter, a spiral, planar induction coil 56 is fabricated such that portions of a plurality of induction coil turns 60 are disposed above the P1 pole 50. Outer portions 64 of the induction coil turns complete the spiral induction coil 56. Typically, a first induction coil electrical interconnect 70 is formed in the central portion of the induction coil spiral and a second electrical interconnect 74 is formed at the outer edge of the induction coil 56. Following the fabrication of the induction coil 56, a second magnetic pole (P2) 80 is fabricated above the P1 pole 50 such that the portions 60 of the induction coil traces pass between the P1 and P2 magnetic poles 50 and 80 respectively. The P2 pole 80 includes a narrow P2 pole tip portion 84 that is separated from the P1 pole 50 by a thin write gap layer 86. When the write head current is fed through the electrical interconnects 70 and 74, and thus through the spiral coil 56, a magnetic flux is created within the two magnetic pole members 50 and 80 such that the magnetic flux passes through the P2 pole tip 84. The passage of the magnetic flux through the pole tip creates a magnetic field that influences the magnetic media hard disk 12 that is disposed proximate the pole tip 84, such that magnetic data bits are written onto the hard disk 12.

Efforts have been undertaken and the prior art to increase the magnetic flux that is created in the two magnetic poles by increasing the number of induction coil turns that are fabricated between the two magnetic poles 50 and 80. Such efforts have included the fabrication of multiple layered induction coils, and the present invention is a method for fabricating a multiple layer induction coil. The present invention involves fabrication steps that comprise an improvement over the prior art photolithographic fabrication methods, and these fabrication steps are next described with the aid of FIGS. 3–14 that are taken from the orientation of view lines 3—3 of FIG. 2.

Figure 3:
FIG. 3 is a side cross-sectional view taken along lines 3—3 of FIG. 2 of an initial fabrication step of the magnetic head of the present invention, which serves as a starting point for the detailed description thereof.

FIG. 3 is a side cross-sectional view of a fabrication step of the magnetic head 20 of the present invention which serves as a starting point for this detailed description. FIG. 3 is oriented along view lines 3—3 of FIG. 2 and depicts an initial fabrication stage following the standard fabrication of a typical P1 pole 50. As is seen by comparing FIGS. 2 and 3, the P1 pole 50 is not depicted in FIG. 3, in that the view line 3—3 is taken through a field area of the wafer substrate above the P1 pole 50. The field area 90 will generally include an insulative material layer 92, that has been deposited on the wafer surface following the P1 pole fabrication process. Thereafter, an insulative layer 94 is fabricated on top of the P1 pole 50. The layer 94 serves to prevent electrical shorting of induction coil traces that are subsequently fabricated on the layer 94, where the induction coil traces are disposed above the P1 pole. As will become clear upon further reading, the insulation layer 94 of the present invention also must act as an etch stop layer in a subsequent induction coil fabrication step; therefore, the composition of the insulative etch stop layer 94 is determined in part by the composition of other material layers that are subsequently deposited as are described hereinbelow.

Figure 4:
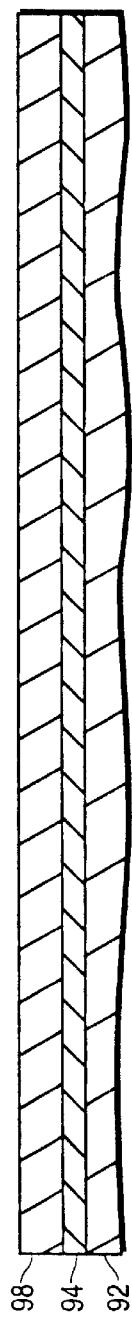
FIGS. 4–15 are side cross-sectional views depicting further fabrication steps of the present invention.
Figure 5:
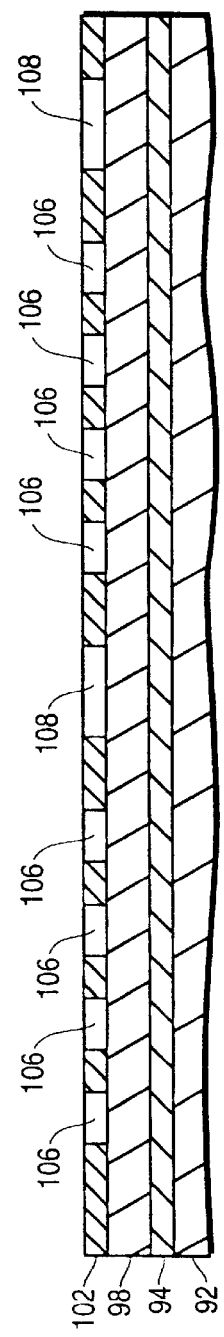

As depicted in FIG. 4, a further layer 98 of dielectric or insulation material is next deposited on top of the etch stop layer 94. The thickness of the layer 98 is generally at least as thick as the desired thickness of a first layer of induction coil traces that will be fabricated within the layer 98, as is described hereinbelow. Thereafter, as depicted in FIG. 5, a patterned etching mask 102 is fabricated upon the flat upper surface of the dielectric layer 98. The patterned mask 102 includes openings 106 for fabricating induction coil trenches and openings 108 for electrical interconnects as are next described.

Figure 6:
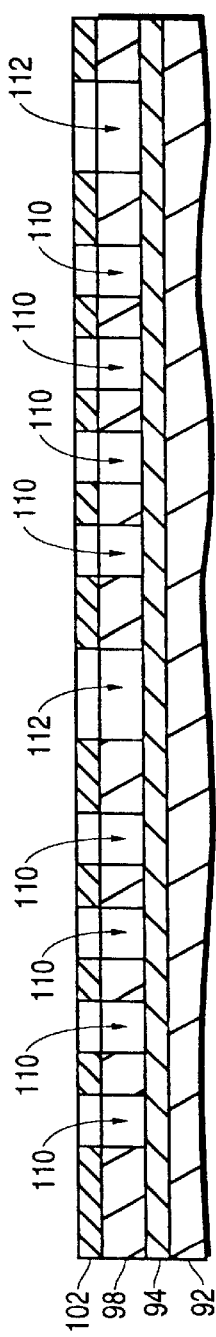

As depicted in FIG. 6, utilizing an ion etch process which is preferably a reactive ion etch (RIE) process, induction coil trenches 110 are etched through the openings 106 in the mask 102 and downward through the dielectric layer 98 to the etch stop layer 94; electrical interconnect trenches 112 are simultaneously etched through the layer 98 to the etch step layer 94. Therefore, the relationship of the materials which comprise the etch stop layer 94 and the dielectric layer 98 must be such that during the RIE step the material comprising the dielectric layer 98 is relatively easily etched, while the material comprising the etch stop layer 94 is significantly more slowly etched. The layer 98 is thus composed of an etchable insulation material. By way of example, where the etchable insulation material layer 98 is composed of an organic polymer such as a hard baked resist, a reactive ion etch process utilizing a gas such as oxygen can be utilized, and the etch stop layer 94 may consist of a substance that is substantially more difficult to etch, such as $SiO_2$ or $Al_2O_3$. Correspondingly, where the etchable insulation material layer 98 is composed of $SiO_2$, the etch stop layer 94 is preferably composed of $Al_2O_3$, and a fluorine containing gas such as $CF_4$ is utilized in the RIE process, because $SiO_2$ is substantially more easily etched by fluorine containing species than $Al_2O_3$.

Figure 7:
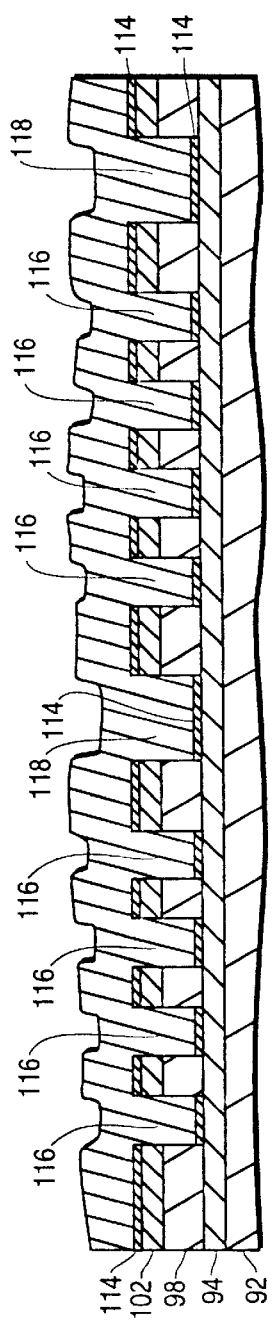
Figure 8:
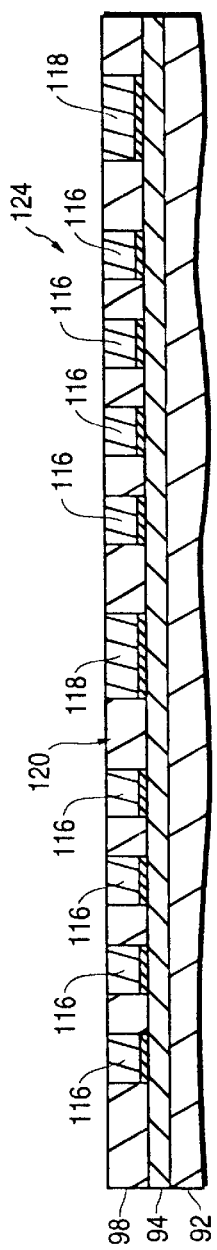

Thereafter, as depicted in FIG. 7, an induction coil structure is fabricated in the typical manner. That is, a seed layer 114, which may consist of tantalum followed by copper is sputter deposited onto the wafer to form a good electrical interconnection and physical bonding at the bottom of the trenches. Thereafter, the induction coil traces 116 and electrical interconnects 118, which are typically composed of copper, are fabricated in a standard electrodeposition process to fill the induction coil trenches 110 and the interconnect trenches 112. Thereafter, as depicted in FIG. 8, a chemical mechanical polishing step (CMP) is conducted to remove the excess copper and the RIE mask 102, such that a flat upper surface 120 is formed. It can now be seen that a first induction coil layer structure 124 has been fabricated within the etchable insulation material layer 98. Due to the excellent process control parameters that are achievable by utilizing the selective reactive ion etch process described above, the induction coil traces 116 can be accurately fabricated with minimal spacing of insulative layer material 98 therebetween. Additionally, due to the use of the RIE process in fabricating the coil trenches 110 within the etchable insulation layer 98, the insulation between the coil traces 116 is more reliably fabricated than in prior art photolithographic processes where the insulation is deposited between the coil traces after the traces have been fabricated. Having fabricated a first induction coil layer structure 124, a second induction coil layer can subsequently be fabricated upon the flat surface 120 of the first layer, by essentially repeating the coil fabrication process, as is next described with the aid of FIGS. 9–15.

Figure 9:
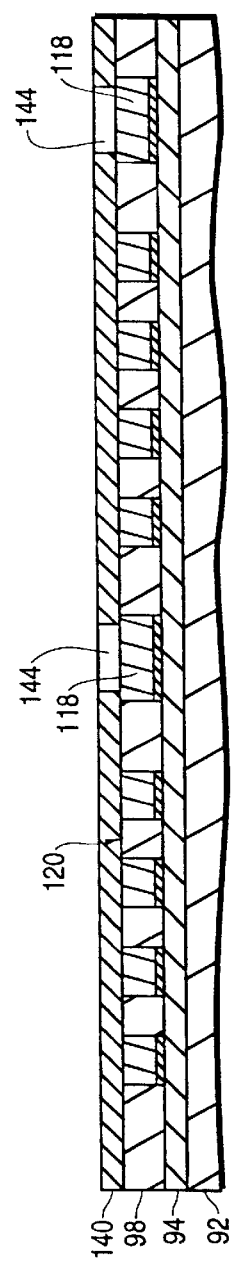
Figure 10:
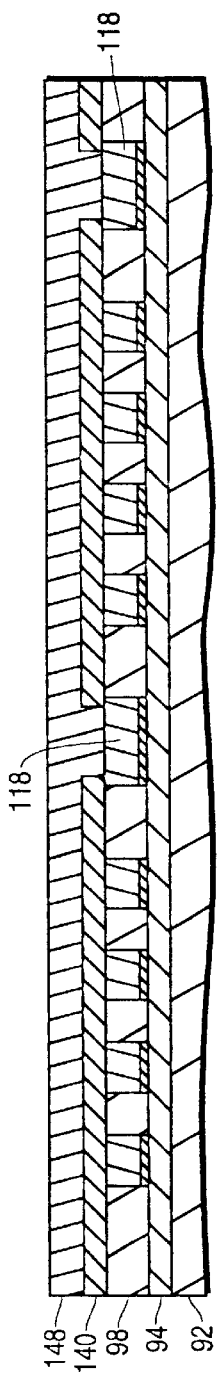
Figure 11:
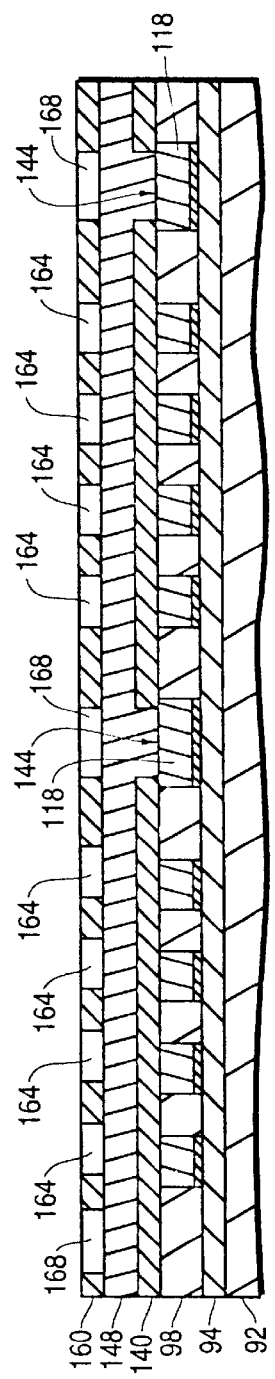

As is depicted in FIG. 9, a patterned second etch stop layer 140 is next fabricated upon the surface 120. The patterning of the second etch stop layer 140 includes a formation of openings 144 for connection to the electrical interconnects 118 fabricated in the first coil layer. Thereafter, as depicted in FIG. 10, a second etchable insulation material layer 148 is deposited upon the etch stop layer 140. The thickness of the layer 148 is determined by the desired thickness of the second induction coil trenches that will be fabricated therein, as is described below. Thereafter, as depicted in FIG. 11, a patterned second induction coil etching mask 160 is fabricated upon the top surface of the layer 148. The patterned mask 160 includes openings 164 for the fabrication of a second layer of induction coil traces, and openings 168 for electrical interconnects. The electrical interconnect openings 168 are therefore fabricated in alignment with the patterned openings 144 in the RIE layer 140 and the electrical interconnects 118 of the first coil layer 124.

Figure 12:
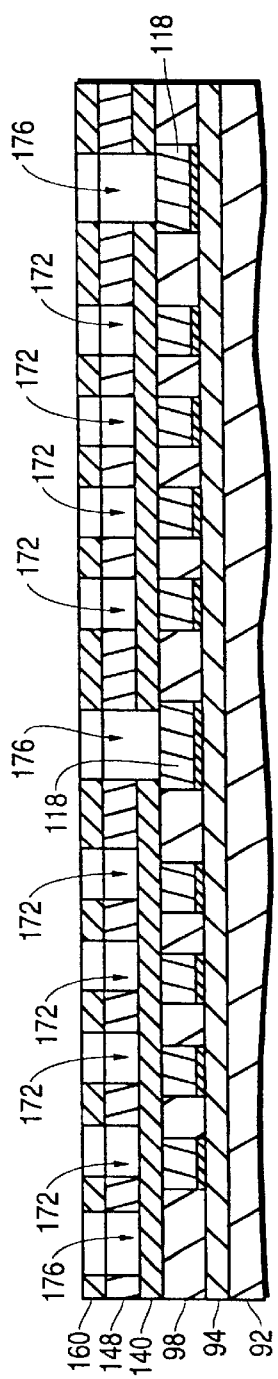

As depicted in FIG. 12, utilizing an ion etch process which is preferably a reactive ion etch (RIE) process, induction coil trenches 172 and interconnect trenches 176 are etched through the layer 148. The etching of the induction coil traces 172 is halted by the etch stop layer 140, whereas the etching of the interconnect trenches 176 continues until the electrical interconnects 118 of the first coil layer are reached. Therefore, the relationship of the materials which comprise the second etch stop layer 140 and the second etchable insulation layer 148 must be such that during the RIE step, the material comprising the layer 148 is relatively easily etched, while the material comprising the etch stop layer 140 is significantly more slowly etched. As described hereabove, where the second etchable insulation material layer 148 is composed of an organic polymer such as a hard baked resist, a reactive ion etch process utilizing a gas such as oxygen can be utilized, and the etch stop layer 140 may consist of a substance that is substantially more difficult to etch, such as $SiO_2$ or $Al_2O_3$. Correspondingly, where the second etchable insulation material layer 148 is composed of $SiO_2$, the etch stop layer 140 is preferably composed of $Al_2O_3$, and a fluorine containing gas such as $CF_4$ is used in the RIE process, because $SiO_2$ is selectively etched to a greater degree than $Al_2O_3$ by a fluorine species RIE process. Additionally, in fabricating the present invention, it is desirable that the etch stop layers 94 and 140 be composed of the same materials, and that the etchable insulation material layers 98 and 148 likewise be composed of the same materials.

Figure 13:
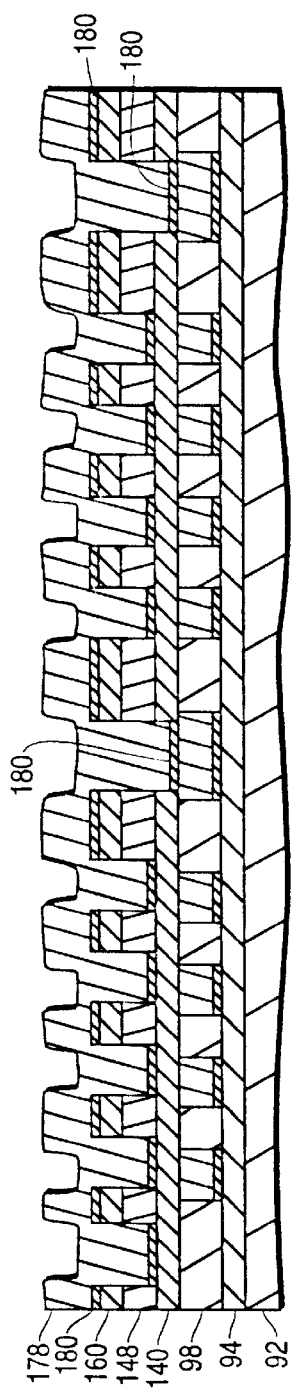
Figure 14:
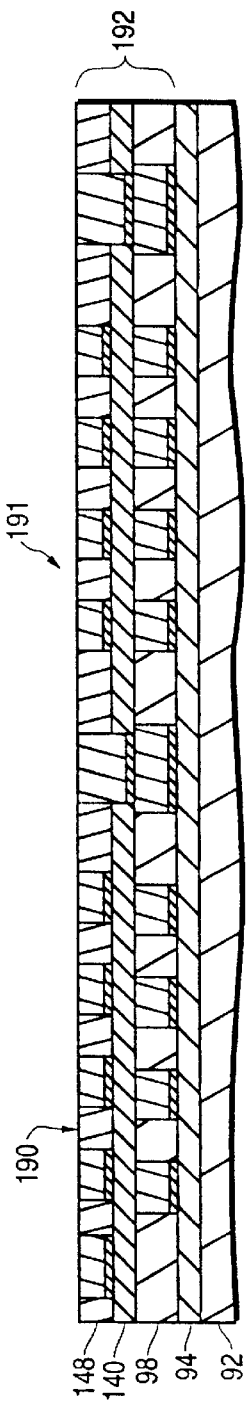
Figure 15:
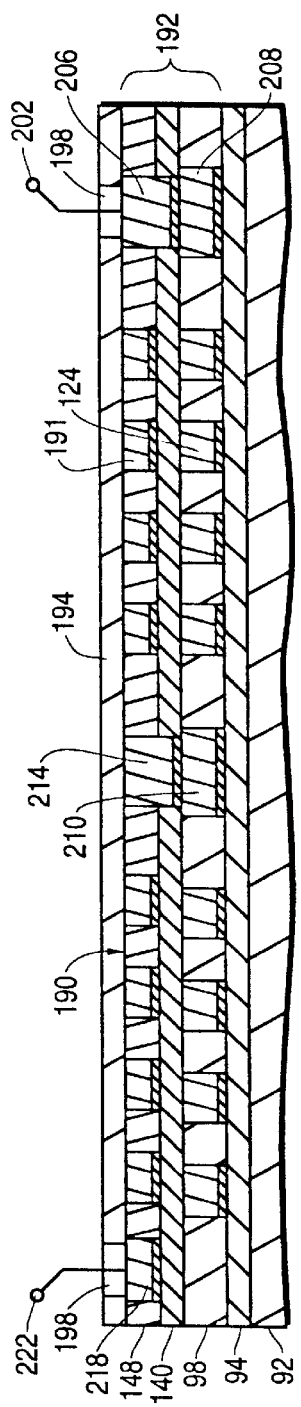

Thereafter, as depicted in FIG. 13, a second induction coil 178 is fabricated by initially depositing a seed layer 180 into the trenches 172 and 176, followed by a standard copper electrodeposition process that is well known to those skilled in the art. Thereafter, as depicted in FIG. 14, a CMP process step is conducted to remove the excess copper and the RIE mask 160, such that a flat upper surface 190 is formed. At this point, the second induction coil structure 191 has been fabricated to complete the dual layer induction coil 192 of the present invention. A patterned insulative layer 194 is next deposited upon the surface 190 to prevent the shorting of the coil traces of the second induction coil structure 191 when the P2 magnetic pole is subsequently deposited above the P1 pole on top of portions of the dual layer induction coil 192. The insulative layer 194 is patterned to include openings 198 for the electrical interconnection of the dual layer induction coil 192. Specifically, as depicted in FIG. 15, a first electrical connection 202 to the right hand electrical interconnect 206 of the dual coil structure 192 is connected to the outer traces interconnect 208 of the lower spiral coil 124. The central interconnect 210 of the lower coil 124 completes the electrical connection to the central interconnect 214 of the upper coil 191. Thereafter, the electrical connection of the upper spiral coil 191 is fed outward at the outer trace electrical coil interconnect 218 to the electrical connection 222. It is to be noted that the electrical connection of the two coil layers according to the right hand rule, results in the reinforcement of the total electromagnetic flux energy from the two coil layers 124 and 191, such that a stronger magnetic flux is created within the P1 and P2 magnetic poles of the magnetic head of the present invention.

While the present invention has been shown and described with regard to certain preferred embodiments, it is to be understood that those skilled in the art will no doubt devise certain alterations and modifications in form and detail hereof that nevertheless include the true spirit and scope of the invention. It is therefore intended that the following claims cover all such alterations and modifications hereof which nevertheless include the true spirit and scope of the invention.

What is claimed is:

1. A magnetic head including a write head, comprising:
   a first magnetic pole;
   a first etch stop layer being disposed above said first magnetic pole;
   a first induction coil structure being fabricated upon said first etch stop layer, said first induction coil structure including a first layer of etchable insulation material being disposed above said first etch stop layer, and a plurality of first induction coil traces being disposed within first coil trenches formed within said first layer of etchable insulation material;
   a second etch stop layer being disposed above said first induction coil structure;
   a second induction coil structure being fabricated upon said second etch stop layer, said second induction coil structure including a second layer of etchable insulation material being disposed above said second etch stop layer, and a plurality of second induction coil traces being disposed within second coil trenches formed within said second layer of etchable insulation material;
   an insulative layer being disposed above said second induction coil structure; and
   a second magnetic pole being disposed above said insulative layer.

2. A magnetic head as described in claim 1 wherein said first induction coil trenches and said second induction coil trenches are formed using a reactive ion etch process.

3. A magnetic head as described in claim 1 wherein said second etch stop layer is disposed upon a planarized surface.

4. A magnetic head as described in claim 1 wherein said first and second etchable insulation material layers are composed of an organic polymer, and said first and second etch stop layers are composed of a material selected from the group consisting of $SiO_2$ and $Al_2O_3$.

5. A magnetic head as described in claim 1 wherein said first and second etchable insulation material layers are composed of $SiO_2$ and said first and second etch stop layers are composed of $Al_2O_3$.

6. A magnetic head as described in claim 1, wherein said first etch stop layer forms a bottom surface of said first coil trenches, and said second etch stop layer forms a bottom surface of said second coil trenches.

7. A magnetic head as described in claim 6, wherein a first seed layer is disposed upon said first etch stop layer within said first coil trench, and said first induction coil traces are disposed upon said first seed layer.

8. A magnetic head as described in claim 6, wherein a second seed layer is disposed upon said second etch stop layer within said second coil trench, and said second induction coil traces are disposed upon said second seed layer.

9. A hard disk drive comprising:

a motor for rotating a spindle;

a magnetic medium disk mounted on said spindle;

an actuator assembly including a magnetic head for writing magnetic information on said disk, said magnetic head including a write head that includes:
a first magnetic pole;
a first etch stop layer being disposed above said first magnetic pole;
a first induction coil structure being fabricated upon said first etch stop layer, said first induction coil structure including a first layer of etchable insulation material being disposed above said first etch stop layer, and a plurality of first induction coil traces being disposed within first coil trenches formed within said first layer of etchable insulation material;
a second etch stop layer being disposed above said first induction coil structure;
a second induction coil structure being fabricated upon said second etch stop layer, said second induction coil structure including a second layer of etchable insulation material being disposed above said second etch stop layer, and a plurality of second induction coil traces being disposed within second coil trenches formed within said second layer of etchable insulation material;
an insulative layer being disposed above said second induction coil structure; and
a second magnetic pole being disposed above said insulative layer.

10. A hard disk drive as described in claim 9 wherein said first induction coil trenches and said second induction coil trenches are formed using a reactive ion etch process.

11. A hard disk drive as described in claim 10 wherein said second etch stop layer is disposed upon a planarized surface.

12. A hard disk drive as described in claim 10 wherein said first and second etchable insulation material layers are composed of an organic polymer, and said first and second etch stop layers are composed of a material selected from the group consisting of $SiO_2$ and $Al_2O_3$.

13. A hard disk drive as described in claim 9, wherein said first etch stop layer forms a bottom surface of said first coil trenches, and said second etch stop layer forms a bottom surface of said second coil trenches.

14. A hard disk drive as described in claim 13, wherein a first seed layer is disposed upon said first etch stop layer within said first coil trench, and said first induction coil traces are disposed upon said first seed layer.

15. A hard disk drive as described in claim 13, wherein a second seed layer is disposed upon said second etch stop layer within said second coil trench, and said second induction coil traces are disposed upon said second seed layer.

* * * * *